United States Patent
Schwarz et al.

(10) Patent No.: US 10,634,051 B2
(45) Date of Patent: Apr. 28, 2020

(54) GEARED TURBOFAN ENGINE WITH LOW PRESSURE ENVIRONMENTAL CONTROL SYSTEM FOR AIRCRAFT

(71) Applicants: Frederick M. Schwarz, Glastonbury, CT (US); Gabriel L. Suciu, Glastonbury, CT (US)

(72) Inventors: Frederick M. Schwarz, Glastonbury, CT (US); Gabriel L. Suciu, Glastonbury, CT (US)

(73) Assignee: United Technologies Corporation, Farmington, CT (US)

( * ) Notice: Subject to any disclaimer, the term of this patent is extended or adjusted under 35 U.S.C. 154(b) by 1429 days.

(21) Appl. No.: 15/932,447

(22) Filed: Jun. 27, 2014

(65) Prior Publication Data
US 2019/0003382 A1  Jan. 3, 2019

Related U.S. Application Data

(63) Continuation-in-part of application No. 13/345,793, filed on Jan. 9, 2012, now Pat. No. 8,904,805.
(Continued)

(51) Int. Cl.
*F02C 6/08* (2006.01)
*B64D 13/06* (2006.01)
(Continued)

(52) U.S. Cl.
CPC .............. *F02C 6/08* (2013.01); *B64D 13/06* (2013.01); *F01D 21/02* (2013.01); *F02C 6/04* (2013.01);
(Continued)

(58) Field of Classification Search
CPC .......... F02C 65/04; F02C 65/06; F02C 65/08; F02C 6/04; F02C 6/06; F02C 6/08;
(Continued)

(56) References Cited

U.S. PATENT DOCUMENTS 2,871,671 A   2/1959 Bartlett, Jr. et al.
4,285,466 A   8/1981 Linscheid et al.
(Continued)

FOREIGN PATENT DOCUMENTS

CA   1014870   8/1977
CA   2850665   4/2013
(Continued)

OTHER PUBLICATIONS

European Search Report for EP Application No. 15174067.7 dated Nov. 19, 2015.
(Continued)

*Primary Examiner* — Steven M Sutherland
(74) *Attorney, Agent, or Firm* — Carlson, Gaskey & Olds, P.C.

(57) ABSTRACT

A gas turbine engine assembly includes a fan section delivering air into a main compressor section. The main compressor section compresses air and delivers air into a combustion section. Products of combustion pass from the combustion section over a turbine section to drive the fan section and main compressor sections. A gearbox is driven by the turbine section to drive the fan section. A pylon supports the gas turbine engine. An environmental control system includes a higher pressure tap at a higher pressure location in the main compressor section, and a lower pressure tap at a lower pressure location. The lower pressure location being at a lower pressure than the higher pressure location. The lower pressure tap communicates to a first passage leading to a downstream outlet and a compressor section of a turbocompressor. The higher pressure tap leads into a turbine section of the turbocompressor such that air in the higher pressure tap drives the turbine section to in turn drive the compressor section of the turbocompressor. The pylon includes a lowermost surface and the higher pressure
(Continued)

tap does not extend above a plane including the lowermost surface. A combined outlet of the compressor section and the turbine section of the turbocompressor intermixes and passes downstream to be delivered to an aircraft use. An environmental control system is also disclosed.

14 Claims, 3 Drawing Sheets

Related U.S. Application Data

(60) Provisional application No. 62/018,129, filed on Jun. 27, 2014.

(51) Int. Cl.
  *F04D 27/00* (2006.01)
  *F01D 21/02* (2006.01)
  *F02C 6/06* (2006.01)
  *F02C 6/04* (2006.01)

(52) U.S. Cl.
  CPC .............. *F02C 6/06* (2013.01); *F04D 27/008* (2013.01); *B64D 2013/0618* (2013.01); *B64D 2013/0648* (2013.01); *F05B 2270/1011* (2013.01); *F05D 2220/323* (2013.01); *F05D 2260/4031* (2013.01); *F05D 2260/40311* (2013.01); *F05D 2260/90* (2013.01); *F05D 2270/021* (2013.01); *F05D 2270/304* (2013.01)

(58) Field of Classification Search
  CPC . B64D 13/06; B64D 2013/0603; F01D 21/02; F04D 27/008
  See application file for complete search history.

(56) References Cited

U.S. PATENT DOCUMENTS

| | | | |
|---|---|---|---|
| 4,644,780 A | | 2/1987 | Jeter |
| 5,083,723 A | | 1/1992 | Grieb et al. |
| 5,137,230 A | | 8/1992 | Coffinberry |
| 5,143,329 A | | 9/1992 | Coffinberry |
| 5,161,364 A | | 11/1992 | Bruun et al. |
| 6,305,156 B1 | * | 10/2001 | Lui .................. B64D 13/06 454/76 |
| 6,412,270 B1 | | 7/2002 | Mortzheim et al. |
| 6,647,730 B2 | | 11/2003 | Liu |
| 6,684,660 B1 | | 2/2004 | Bruno et al. |
| 7,171,819 B2 | | 2/2007 | Lui et al. |
| 7,305,842 B1 | | 12/2007 | Schiff |
| 7,549,291 B2 | | 6/2009 | Wollenweber et al. |
| 7,607,308 B2 | | 10/2009 | Kraft et al. |
| 7,785,066 B2 | | 8/2010 | Bil et al. |
| 7,926,261 B2 | | 4/2011 | Porte |
| 8,276,392 B2 | | 10/2012 | Van Der Woude |
| 8,438,832 B1 | * | 5/2013 | Brilliant ................. F01D 5/141 60/226.1 |
| 8,677,761 B2 | | 3/2014 | Leach et al. |
| 9,452,841 B2 | | 9/2016 | Richardson |
| 9,650,967 B2 | | 5/2017 | DeFrancesco |
| 2003/0039473 A1 | | 2/2003 | Zhang et al. |
| 2009/0000305 A1 | | 1/2009 | Porte et al. |
| 2009/0044543 A1 | * | 2/2009 | Clemen .................. F02C 6/08 60/785 |
| 2012/0180501 A1 | | 7/2012 | Army |
| 2012/0180509 A1 | | 7/2012 | DeFrancesco |
| 2012/0216545 A1 | | 8/2012 | Sennoun et al. |
| 2013/0025258 A1 | * | 1/2013 | Merry ...................... F02C 7/06 60/226.1 |
| 2013/0040545 A1 | | 2/2013 | Finney |
| 2013/0097992 A1 | | 4/2013 | Suciu et al. |
| 2013/0125561 A1 | | 5/2013 | Schwarz et al. |
| 2013/0174573 A1 | | 7/2013 | Hipsky et al. |
| 2013/0177399 A1 | * | 7/2013 | McAuliffe ............. B64D 13/06 415/118 |
| 2013/0187007 A1 | | 7/2013 | Mackin et al. |
| 2014/0000279 A1 | | 1/2014 | Brousseau et al. |
| 2014/0050574 A1 | | 2/2014 | Chrabascz |
| 2014/0165588 A1 | | 6/2014 | Snape et al. |
| 2015/0104289 A1 | | 4/2015 | Mackin et al. |
| 2015/0121842 A1 | * | 5/2015 | Moes ..................... B64D 13/06 60/204 |
| 2015/0360786 A1 | | 12/2015 | Oberpriller et al. |
| 2016/0010589 A1 | | 1/2016 | Rolt |
| 2016/0090917 A1 | | 3/2016 | Bruno et al. |

FOREIGN PATENT DOCUMENTS

| | | |
|---|---|---|
| EP | 2557038 | 2/2013 |
| EP | 2613035 | 7/2013 |
| EP | 2613035 A2 | 7/2013 |
| EP | 2617965 A2 | 7/2013 |
| EP | 2620616 A2 | 7/2013 |
| FR | 2851295 A1 | 8/2004 |
| GB | 2243407 A | 10/1991 |
| GB | 2243408 A | 10/1991 |
| JP | 2004-37038 A | 2/2004 |

OTHER PUBLICATIONS

European Search Research Report for EP Application No. 15174218.6 dated Nov. 19, 2015.
Coy, Peter. The Little Gear That Could Reshape the Jet Engine: Bloomberg Business, Oct. 15, 2015, pp. 1-4.
Rauch, Dale. "Design Study of an Air Pump and Integral LifeEngine ALF-504 Using the Lycoming 502 Cote" NASA Report CR-120992, NASA Lewis Research Center, Cleveland, OH, 1972, pp. 1-182.
Warwick, G. "Civil engines: Pratt & Whitney gears up for the future with GTF", Flight International, Nov. 2007.
Escobar, Joe. "Turbine Engine Compressor Sections: Basic theory and operation" Aircraft Maintenance Technology, 2003.
European Search Report for EP Application No. 15175737.4 dated Nov. 20, 2015.

\* cited by examiner

GEARED TURBOFAN ENGINE WITH LOW PRESSURE ENVIRONMENTAL CONTROL SYSTEM FOR AIRCRAFT

CROSS REFERENCE TO RELATED APPLICATION

This application is a continuation in part of U.S. application Ser. No. 13/345,793 filed Jan. 9, 2012, now granted U.S. Pat. No. 8,904,805. This application also claims priority to U.S. Provisional Application 62/018,129 filed Jun. 27, 2014.

BACKGROUND OF THE INVENTION

This application relates to an environmental control system for an aircraft which taps both high and low pressure compressed air for uses on an aircraft.

Environmental control systems are known, and associated with an aircraft. Typically, these systems tap air from a gas turbine engine on the aircraft, and send it to the aircraft cabin, and other air uses on the aircraft.

The systems typically tap low pressure compressed air from a lower pressure compressor location, and higher pressure compressed air from a higher pressure compressor location. The two are utilized at distinct times during the operation of a gas turbine engine, dependent on the needs, and the available air.

In the prior art, when the higher pressure air is tapped, it is at a very high temperature. Thus, cooling of the air must occur. It is typical that some form of intercooler or other heat exchanger is included.

In addition, the higher pressure compressed air has already been compressed beyond the level of the lower pressure compressed air. The more higher pressure compressed air that is diverted away from engine uses, the lower the efficiency of the engine.

SUMMARY

In a featured embodiment, a gas turbine engine assembly includes a fan section delivering air into a main compressor section. The main compressor section compresses air and delivers air into a combustion section. Products of combustion pass from the combustion section over a turbine section to drive the fan section and main compressor sections. A gearbox is driven by the turbine section to drive the fan section. A pylon supports the gas turbine engine. An environmental control system includes a higher pressure tap at a higher pressure location in the main compressor section, and a lower pressure tap at a lower pressure location. The lower pressure location being at a lower pressure than the higher pressure location. The lower pressure tap communicates to a first passage leading to a downstream outlet and a compressor section of a turbocompressor. The higher pressure tap leads into a turbine section of the turbocompressor such that air in the higher pressure tap drives the turbine section to in turn drive the compressor section of the turbocompressor. The pylon includes a lowermost surface and the higher pressure tap does not extend above a plane including the lowermost surface. A combined outlet of the compressor section and the turbine section of the turbocompressor intermixes and passes downstream to be delivered to an aircraft use.

In another embodiment according to the previous embodiment, the gearbox provides a gear reduction of at least about 2.0.

In another embodiment according to any of the previous embodiments, the turbine section includes a fan drive turbine that drives the gearbox and one of the main compressor sections.

In another embodiment according to any of the previous embodiments, the main compressor section includes a first compressor section and a second compressor section and the first compressor section includes at least four (4) stages and no more than seven (7) stages.

In another embodiment according to any of the previous embodiments, bleed air is taken from at least a fourth stage of the first compressor section.

In another embodiment according to any of the previous embodiments, the turbine section includes a first turbine section driving a high pressure compressor, an intermediate turbine section driving a low pressure compressor and a third turbine section driving the fan section.

In another embodiment according to any of the previous embodiments, the main compressor section includes a first compressor section and a second compressor section and the first compressor section includes at least three (3) stages and no more than eight (8) stages.

In another embodiment according to any of the previous embodiments, bleed air is taken from at least a third stage of the first compressor section.

In another embodiment according to any of the previous embodiments, includes a control valve in fluid communication with an inlet to the compressor of the turbocompressor.

In another embodiment according to any of the previous embodiments, includes a valve disposed between low pressure tap and the compressor section of the turbocompressor.

In another embodiment according to any of the previous embodiments, includes a sensor generating data indicative of a speed of the turbine of the turbocompressor.

In another embodiment according to any of the previous embodiments, includes a brake for controlling rotation of the turbine of the turbocompressor responsive to detection of an overspeed condition.

In another featured embodiment, an environmental control system for an aircraft includes a higher pressure tap to be associated with a higher pressure location in a main compressor section associated with an engine of the aircraft, and a lower pressure tap to be associated with a lower pressure location in the main compressor section. The lower pressure location being at a lower pressure than the higher pressure location. The lower pressure tap communicates to a first passage leading to a downstream outlet, and a compressor section of a turbocompressor. The higher pressure tap leads into a turbine section of the turbocompressor such that air in the higher pressure tap drives the turbine section to in turn drive the compressor section of the turbocompressor. The higher pressure tap is disposed below a plane including a lowermost surface of a pylon supporting the main compressor section associated with the engine of the aircraft. A combined outlet of the compressor section and the turbine section of the turbocompressor intermixes and passes downstream to be delivered to an aircraft use.

In another embodiment according to the previous embodiment, a check valve is disposed within the first passage associated with the lower pressure tap.

In another embodiment according to any of the previous embodiments, a control valve is positioned on the higher pressure tap, and may be closed to drive air through the first passage associated with the lower pressure tap, or to have air pass through the compressor section of the turbocompressor when the control valve is opened.

In another embodiment according to any of the previous embodiments, a redundant valve is provided to be closed if the control valve associated with the higher pressure tap fails.

In another embodiment according to any of the previous embodiments, the redundant valve is positioned to be downstream of a location at which the first passage and the combined outlet intermix into a common conduit.

In another embodiment according to any of the previous embodiments, includes a control valve disposed between the low pressure tap and the compressor section of the turbocompressor.

In another embodiment according to any of the previous embodiments, includes a sensor generating data indicative of a speed of the turbine section of the turbocompressor.

In another embodiment according to any of the previous embodiments, includes a brake for controlling rotation of the turbine of the turbocompressor responsive to detection of an overspeed condition.

Although the different example have specific components shown in the illustrations, embodiments of this disclosure are not limited to those particular combinations. It is possible to use some of the components or features from one of the examples in combination with features or components from another one of the examples.

These and other features disclosed herein can be best understood from the following specification and drawings, the following of which is a brief description.

DETAILED DESCRIPTION

Figure 1A:
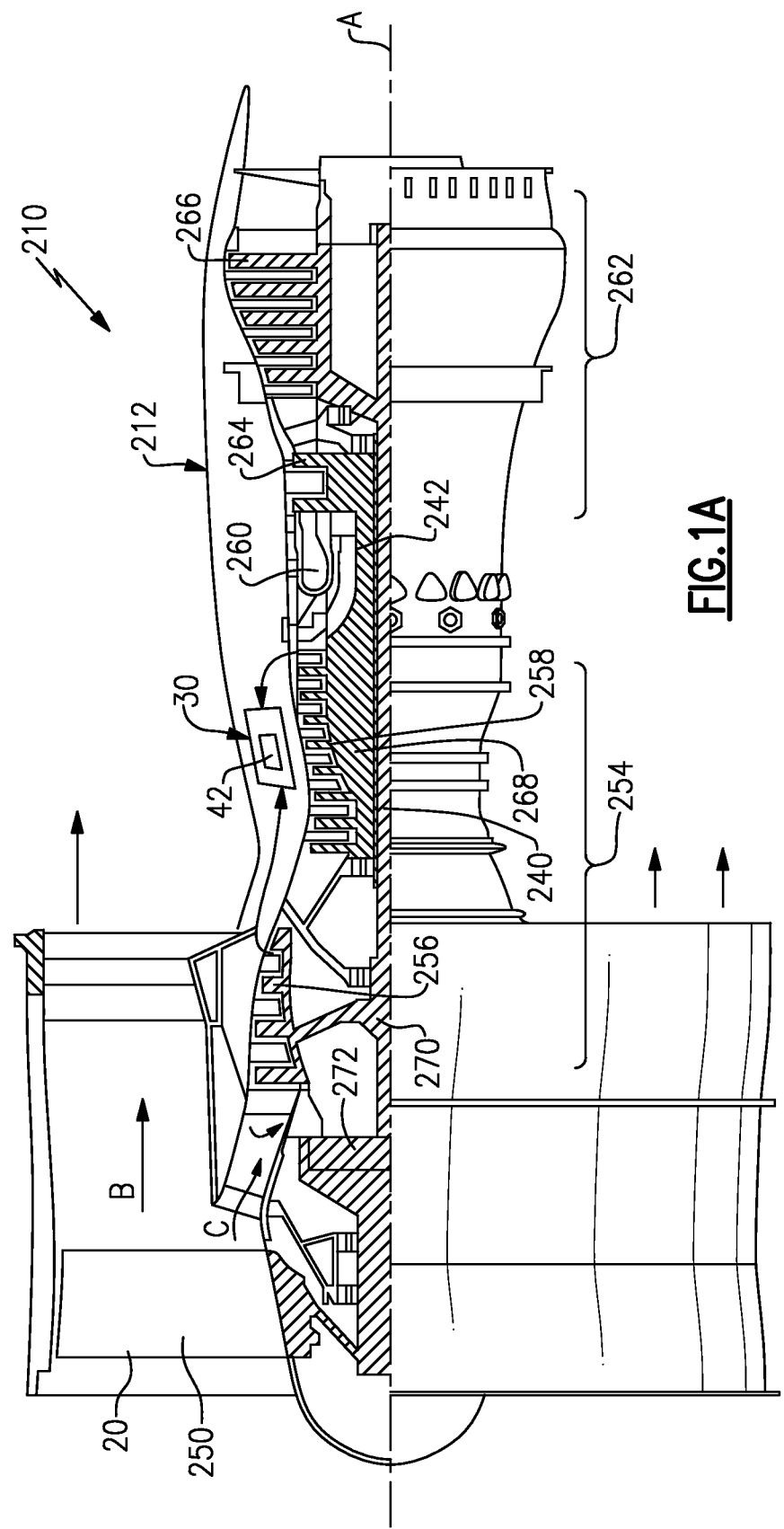
FIG. 1A schematically shows an embodiment of a gas turbine engine.

A gas turbine engine 210 is shown in FIG. 1A. As shown, the engine 210 includes a fan 250 (which includes a plurality of fan blades 20), a main compressor section 254 (which includes both a low pressure compressor 256 and a high pressure compressor 258), a combustor 260, and a turbine section 262 (which includes both a high pressure turbine 264 and a low pressure turbine 266). The high pressure compressor 258 is driven, via a first spool 268, by the high pressure turbine 264. The low pressure compressor 256 is driven, via a second spool 270, by the low pressure turbine 266. Also driven by the low pressure turbine 266 are the fan blades 20 of the fan 250, which fan is coupled to the second spool 270 via a geared architecture 272.

The fan section 250 drives air along a bypass flow path B while the compressor section 254 draws air in along a core flow path C where air is compressed and communicated to a combustor section 260. In the combustor section 260, air is mixed with fuel and ignited to generate a high pressure exhaust gas stream that expands through the turbine section 262 where energy is extracted and utilized to drive the fan section 250 and the compressor section 254.

The second spool 270 generally includes an inner shaft 240 that connects the fan 250 and the low pressure (or first) compressor section 256 to a low pressure (or first) turbine section 266. The low pressure turbine 266 is also referred to as the fan drive turbine as it drives the fan 250 either directly or as is shown through the geared architecture 272. The inner shaft 240 drives the fan 250 through a speed change device, such as the geared architecture 272, to drive the fan 250 at a lower speed than the low speed spool 270. The high-speed spool 268 includes an outer shaft 242 that interconnects the high pressure (or second) compressor section 258 and the high pressure (or second) turbine section 264. The inner shaft 240 and the outer shaft 242 are concentric and rotate via the bearing systems disposed about the engine central longitudinal axis A.

Figure 1B:
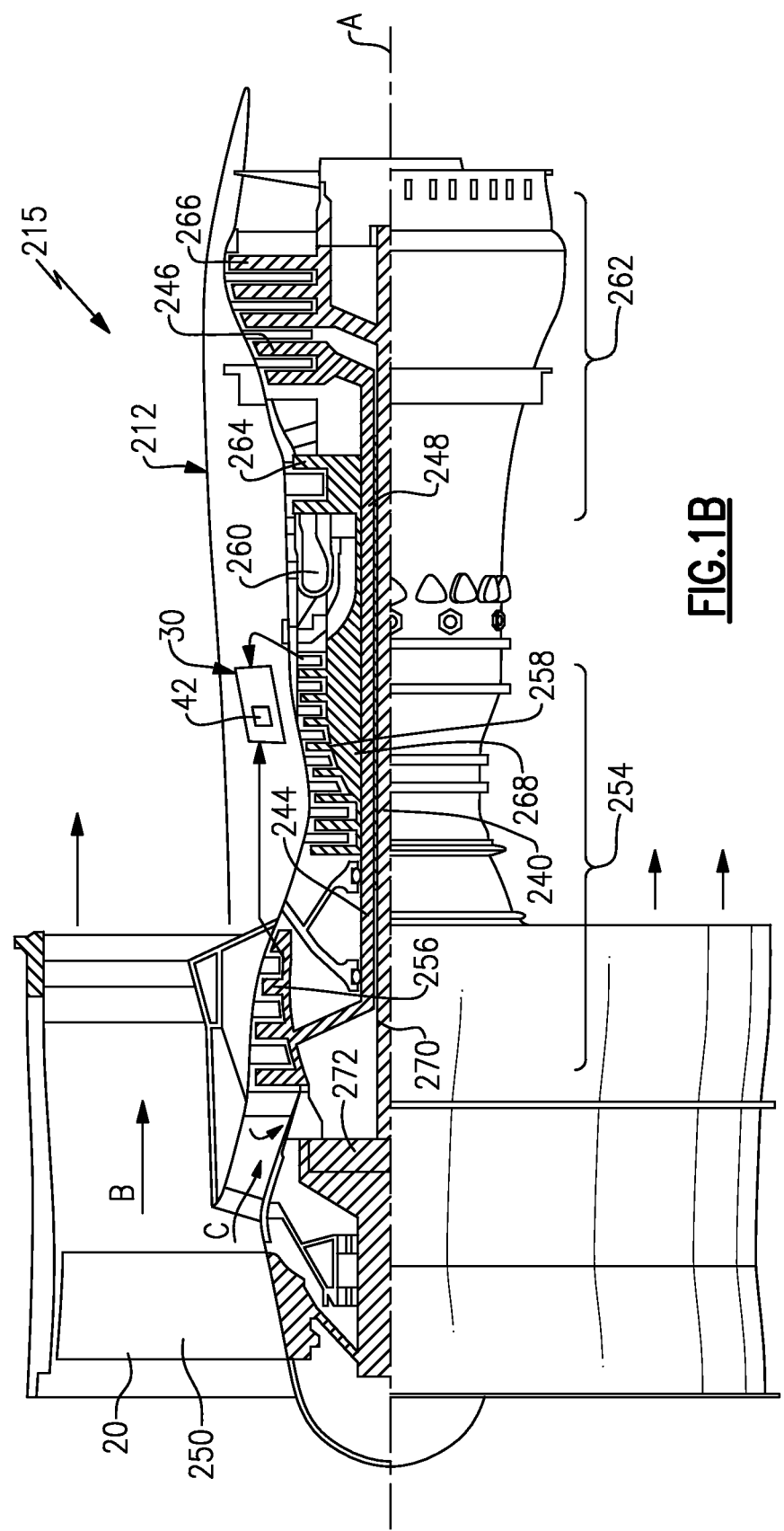
FIG. 1B schematically shows another gas turbine engine.

Referring to FIG. 1B, another disclosed example gas turbine engine 215 includes an intermediate or third spool 248. The engine 215 includes structures similar to those disclosed and described with regard to the engine 210 shown in FIG. 1A such that like structures are provided with the same reference numerals. The intermediate spool 248 includes an intermediate pressure turbine 246. The low pressure compressor 256 is driven, via the intermediate spool 248 through an intermediate shaft 244 coupled to the intermediate pressure turbine 246. The intermediate shaft 244 is concentric with the inner shaft 240 of the second spool and the outer shaft 242 of the first spool 268. The low pressure turbine 266 drives the fan blades 20 of the fan section 250. In this example, the low pressure turbine 256 drives the inner shaft 240 to only drive the geared architecture 272 that in turn drives the fan section 250. It should be appreciated, that the low pressure turbine 256 could also directly drive the fan section without the speed reduction provided by the geared architecture 272.

The disclosed gas turbine engines 210, 215 in one example are high-bypass geared aircraft engines. In a further example, the gas turbine engines 210, 215 each include a bypass ratio greater than about six (6), with an example embodiment being greater than about ten (10). The example geared architecture 272 is an epicyclical gear train, such as a planetary gear system, star gear system or other known gear system, with a gear reduction ratio of greater than about 2.0.

In the disclosed embodiments, the gas turbine engines 210, 215 include a bypass ratio greater than about ten (10:1) and the fan diameter is significantly larger than an outer diameter of the low pressure compressor 256. It should be understood, however, that the above parameters are only exemplary of embodiments of a gas turbine engine including a geared architecture and that the present disclosure is applicable to other gas turbine engines.

A significant amount of thrust is provided by the bypass flow B due to the high bypass ratio. The fan section 250 is designed for a particular flight condition—typically cruise at about 0.8 Mach and about 35,000 feet. The flight condition of 0.8 Mach and 35,000 ft., with the engine at its best fuel consumption—also known as "bucket cruise Thrust Specific Fuel Consumption ('TSFC')"—is the industry standard parameter of pound-mass (lbm) of fuel per hour being burned divided by pound-force (lbf) of thrust the engine produces at that minimum point.

"Low fan pressure ratio" is the pressure ratio across the fan blade alone, without a Fan Exit Guide Vane ("FEGV") system. The low fan pressure ratio as disclosed herein according to one non-limiting embodiment is less than about 1.50. In another non-limiting embodiment the low fan pressure ratio is less than about 1.45.

"Low corrected fan tip speed" is the actual fan tip speed in ft/sec divided by an industry standard temperature correction of $[(Tram\ °R)/(518.7°\ R)]^{0.5}$. The "Low corrected fan tip speed", as disclosed herein according to one non-limiting embodiment, is less than about 1150 ft/second.

The example low pressure compressor section 256 includes at least 4 stages. In one disclosed embodiment the low pressure compressor 256 includes seven (7) stages. In another disclosed embodiment the low pressure compressor includes at least four (4) and up to seven (7) stages. In another disclosed embodiment, the example low pressure compressor section 256 includes at least four (4) stages and up to about eight (8) stages. In yet another disclosed embodiment the low pressure compressor 256 includes eight (8) stages.

An environmental control system 30 for use on an aircraft receives air from portions of the compressor 254. In this example, the ECS system 30 receives air from a portion of the low pressure compressor 256 and the high pressure compressor 258.

Figure 2:
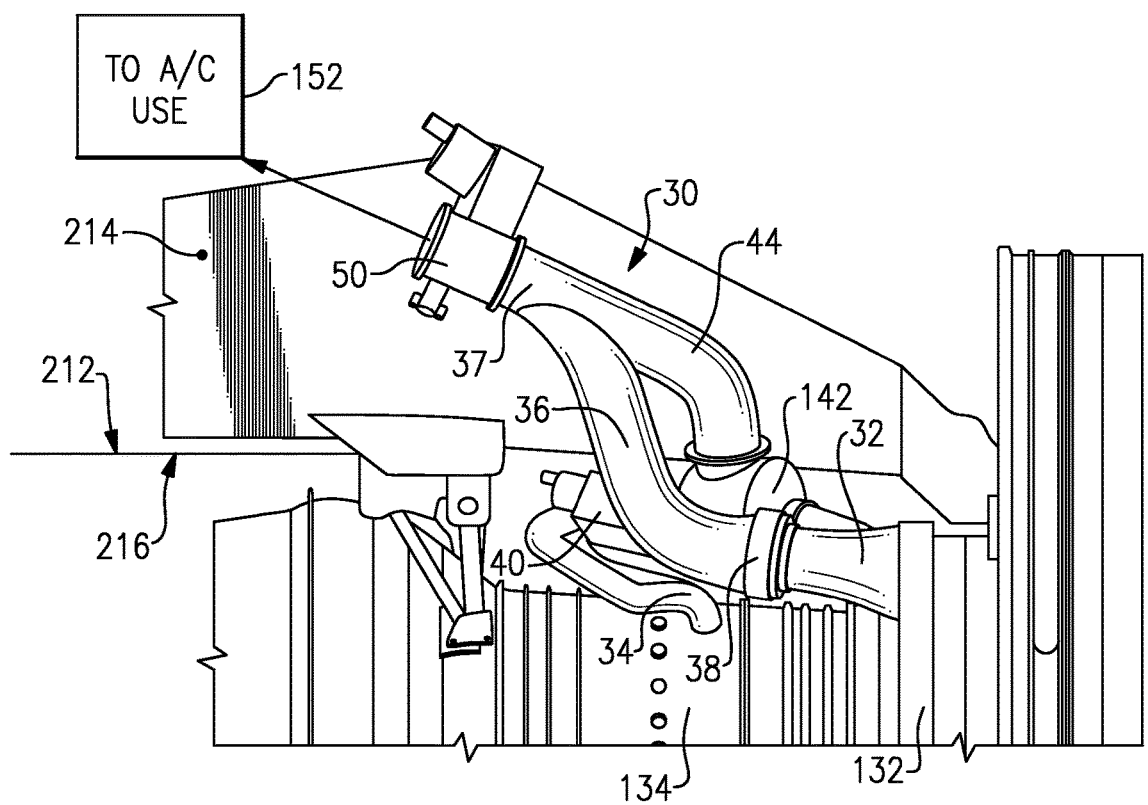
FIG. 2 shows an embodiment of an environmental control system for an aircraft.

Referring to FIG. 2 with continued reference to FIGS. 1A and 1B, the ECS 30 for use on an aircraft is illustrated. A high pressure compression location 134 has a tap 34 as shown in FIG. 2. Another tap 32 is at a lower pressure location 132. Locations 132 and 134 may both be within the high pressure compressor 258 or one may be in the lower pressure compressor section 256. However, the tap 34 is downstream of the tap 32, and at a higher pressure location.

The compressor section 254, combustor 260 and the turbine section 262 are disposed within a core cowling schematically indicated at 212. The core cowling 212 is disposed about the core engine features. The engines 210, 215 are supported on an aircraft by a pylon 214 (shown in FIG. 2) that defines a lowermost surface 216 also referred to as a plane. The lower plane 216 is the lowest extent of the pylon 214 toward the engine 210, 215. The example ECS 30 including turbocompressor 42 (described below) is disposed within the engine cavity defined within the core cowling 212.

Figure 3:
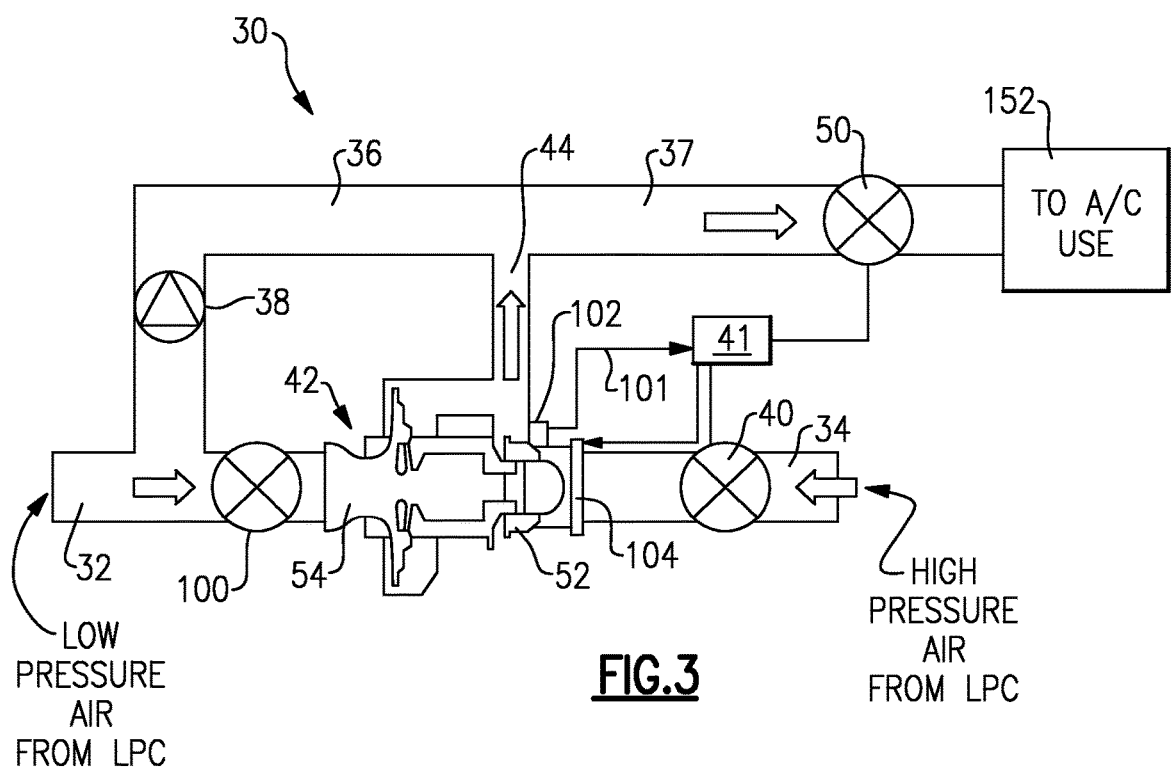
FIG. 3 shows a schematic of the FIG. 2 system.

Referring to FIG. 3 with continued reference to FIG. 2, the tap 32 leads to first passage 36 having a check valve 38, and also into the compressor section 54 of a turbocompressor 42. The high pressure tap 34 leads into a turbine section 52 of the turbocompressor 42. The exits of both compressor section 54 and turbine section 52 of turbocompressor 42 pass into a common outlet 44.

The outlet 44 merges with the first passage 36 and both pass through a valve 50 within a common outlet 37 leading to an aircraft use 152.

As shown in FIG. 3, the tap 32 alternatively leads to compressor section 54 or into the first passage 36 leading to the combined outlet 37. Check valve 38 allows flow from tap 32 to the first passage 36 in a single direction. It also provides some resistance to flow in that direction. The tap 34 leads through a modulating and shutoff valve 40 which can be opened or closed by a controller 41, shown schematically. Air from the higher compressed location at tap 34 is expanded across the turbine section 52 into the outlet 44. In one example higher pressure air is provided from the high pressure compressor 258 to the tap 34.

The tap 34 communicates high pressure and temperature air to the turbocompressor 42 and does not pierce the plane 216 defined by the lowest portion of the pylon 214.

The high pressure and temperature air from the tap 34 drives the turbine section 52 that drives the compressor section 54 to compress the air from the tap 32, and increase pressure of airflow into the combined outlet 37. Outlets from each of the turbine section 52 and the compressor section 54 mix in the outlet 44, and pass to the combined outlet 37. When the compressor section 54 is being driven by the turbine section 52, there is suction applied to the first passage 36 and the tap 32, and thus check valve 38 will remain closed.

In one example, bleed air is taken from a fourth stage of the low pressure compressor 256 and fed to the tap 32. The air from the tap 32 is used generally exclusively under certain conditions when the heat to be rejected is at a maximum. As an example, airflow will tend to pass from tap 32 through the check valve 38 to the first passage 36 during climb and cruise. At such times the valve 40 is maintained closed to limit the diversion of compressed air.

However, under certain conditions, as an example a descent, the valve 40 is opened and the turbine section 52 is driven and air from tap 32 passes to the compressor section 54. Expansion of higher temperature and pressure air from tap 34 through the turbine section 52 lowers its temperature. Further, mixing it with the lower pressure compressed air from the tap 32, even when compressed to a higher pressure by compressor section 54, may eliminate the need for a separate heat exchanger on the outlet 44. The intermixed air may be at a useful temperature when it reaches the combined outlet 37. The amount of air from the two taps can be varied to achieve this.

The valve 50 is a control valve which may be closed if the valve 40 fails. At such times, it may be more desirable to supply no air to the system 152, then to have an open diversion from the tap 34.

A valve 100 is provided prior to the compressor section 54 and is controlled by the controller 41. The valve 100 is actuated to close off flow from the low pressure compressor 256 to control and modulate low pressure airflow into the compressor 54.

A sensor 102 is provided that generates data indicative of turbine speed that is sent by way of communication line 101 to the controller 41. The sensor 102 is configured to provide information indicative of a turbine overspeed condition. The controller 41 will actuate, and/or close valves 100, 40 and 50 in a desired combination to prevent damage to the system. In one example, the controller 41 will receive information from the sensor 102 indicative of the onset, or actual overspeed condition of the turbine 52. The controller 41 utilizes at least data from the sensor 102, along with other data available of engine operation to recognize a current or potential turbine speed condition that warrants shutdown or other remedial actions. The controller 41 may close the valve 40 to prevent flow of high pressure air that drives the turbine 52. A brake 104 may also be employed to shutdown the turbine 52 if an overspeed condition or other undesirable operating condition is detected or indicated.

The elimination of a required heat exchanger, and the use of less air from the higher compression location, is particularly valuable when combined with a system incorporating a gear drive for the turbo fan, such as shown at 272 in FIGS. 1A and 1B.

Although an example embodiment has been disclosed, a worker of ordinary skill in this art would recognize that certain modifications would come within the scope of this disclosure. For that reason, the following claims should be studied to determine the true scope and content of this disclosure.

The invention claimed is:

1. A gas turbine engine assembly comprising:
   a fan section delivering air into a main compressor section, said main compressor section compressing air and delivering air into a combustion section, products of combustion passing from said combustion section over a turbine section to drive said fan section and main compressor section, wherein a gearbox is driven by said turbine section to drive said fan section and the main compressor section includes a first compressor section aft of the fan section and forward of a second compressor section;

a pylon supporting the gas turbine engine;

an environmental control system including a higher pressure tap at a higher pressure location in said second compressor section of the main compressor section, and a lower pressure tap at a lower pressure location within the first compressor section of the main compressor section, said lower pressure location being at a lower pressure than said higher pressure location;

said lower pressure tap communicating to a first passage leading to a downstream outlet and a compressor section of a turbocompressor;

said higher pressure tap leading into a turbine section of said turbocompressor such that air in said higher pressure tap drives said turbine section to in turn drive said compressor section of said turbocompressor, wherein the pylon includes a lowermost surface and the higher pressure tap does not extend above a plane including the lowermost surface;

a combined outlet of said compressor section and said turbine section of said turbocompressor intermixing and passing downstream to be delivered to an aircraft use;

a control valve disposed between the lower pressure tap and the first compressor section of the turbocompressor for closing off airflow from the lower pressure tap within the first compressor section into an inlet of the compressor section of the turbocompressor; and a brake for controlling rotation of the turbine section of the turbocompressor responsive to detection of an overspeed condition.

2. The gas turbine engine assembly as recited in claim 1, wherein the turbine section includes a fan drive turbine that drives the gearbox and one of the main compressor sections.

3. The gas turbine engine assembly as recited in claim 1, wherein the main compressor section includes a first compressor section and a second compressor section, wherein the first compressor section includes at least four (4) stages and no more than seven (7) stages.

4. The gas turbine assembly engine as recited in claim 3, wherein bleed air is taken from at least a fourth stage of the first compressor section.

5. The gas turbine engine assembly as recited in claim 4, wherein the turbine section includes a first turbine section driving a high pressure compressor, an intermediate turbine section driving a low pressure compressor and a third turbine section driving the fan section.

6. The gas turbine engine assembly as recited in claim 1, wherein the main compressor section includes a first compressor section and a second compressor section and the first compressor section includes at least three (3) stages and no more than eight (8) stages.

7. The gas turbine engine assembly as recited in claim 6, wherein bleed air is taken from at least a third stage of the first compressor section.

8. The gas turbine engine assembly as recited in claim 1, including a sensor generating data indicative of a speed of the turbine section of the turbocompressor.

9. A gas turbine engine assembly comprising:

a fan section delivering air into a main compressor section, said main compressor section compressing air and delivering air into a combustion section, products of combustion passing from said combustion section over a turbine section to drive said fan section and main compressor section, wherein a gearbox is driven by said turbine section to drive said fan section;

a pylon supporting the gas turbine engine;

an environmental control system including a higher pressure tap at a higher pressure location in said main compressor section, and a lower pressure tap at a lower pressure location, said lower pressure location being at a lower pressure than said higher pressure location;

said lower pressure tap communicating to a first passage leading to a downstream outlet and a compressor section of a turbocompressor;

said higher pressure tap leading into a turbine section of said turbocompressor such that air in said higher pressure tap drives said turbine section to in turn drive said compressor section of said turbocompressor, wherein the pylon includes a lowermost surface and the higher pressure tap does not extend above a plane including the lowermost surface;

a combined outlet of said compressor section and said turbine section of said turbocompressor intermixing and passing downstream to be delivered to an aircraft use;

a sensor generating data indicative of a speed of the turbine section of the turbocompressor; and a brake for controlling rotation of the turbine section of the turbocompressor responsive to detection of an overspeed condition.

10. An environmental control system for an aircraft comprising:

a higher pressure tap to be associated with a higher pressure location in a main compressor section associated with an engine of the aircraft, and a lower pressure tap to be associated with a lower pressure location in said main compressor section, said lower pressure location being aft of a fan section within the main compressor section and at a lower pressure than said higher pressure location;

said lower pressure tap communicating to a first passage leading to a downstream outlet, and a compressor section of a turbocompressor;

said higher pressure tap leading into a turbine section of said turbocompressor such that air in said higher pressure tap drives said turbine section to in turn drive said compressor section of said turbocompressor, wherein said higher pressure tap is disposed below a plane including a lowermost surface of a pylon supporting the main compressor section associated with the engine of the aircraft;

a combined outlet of said compressor section and said turbine section of said turbocompressor intermixing and passing downstream to be delivered to an aircraft use;

a control valve disposed between the lower pressure tap and the compressor section of the turbocompressor;

a second control valve is positioned on said higher pressure tap, and may be closed to drive air through said first passage associated with said lower pressure tap, or to have air pass through said compressor section of said turbocompressor when said control valve is opened;

a redundant valve is provided to be closed if said control valve associated with said higher pressure tap fails; and a brake for controlling rotation of the turbine section of the turbocompressor responsive to detection of an overspeed condition.

11. The environmental control system as recited in claim 10, wherein a check valve is disposed within said first passage associated with said lower pressure tap.

12. The environmental control system as recited in claim 10, wherein said redundant valve is positioned to be downstream of a location at which said first passage and said combined outlet intermix into a common conduit.

13. The environmental control system as recited in claim 10, including a sensor generating data indicative of a speed of the turbine section of the turbocompressor.

14. An environmental control system for an aircraft comprising:

a higher pressure tap to be associated with a higher pressure location in a main compressor section associated with an engine of the aircraft, and a lower pressure tap to be associated with a lower pressure location in said main compressor section, said lower pressure location being at a lower pressure than said higher pressure location;

said lower pressure tap communicating to a first passage leading to a downstream outlet, and a compressor section of a turbocompressor;

said higher pressure tap leading into a turbine section of said turbocompressor such that air in said higher pressure tap drives said turbine section to in turn drive said compressor section of said turbocompressor, wherein said higher pressure tap is disposed below a plane including a lowermost surface of a pylon supporting the main compressor section associated with the engine of the aircraft;

a combined outlet of said compressor section and said turbine section of said turbocompressor intermixing and passing downstream to be delivered to an aircraft use; and a sensor generating data indicative of a speed of the turbine section of the turbocompressor; and a brake for controlling rotation of the turbine section of the turbocompressor responsive to detection of an overspeed condition.

* * * * *